US008863682B2

United States Patent
Horton, III

(10) Patent No.: US 8,863,682 B2
(45) Date of Patent: Oct. 21, 2014

(54) HELICAL BEND RESTRICTOR

(75) Inventor: Edward E. Horton, III, Houston, TX (US)

(73) Assignee: Horton Wison Deepwater, Inc., Houston, TX (US)

( * ) Notice: Subject to any disclaimer, the term of this patent is extended or adjusted under 35 U.S.C. 154(b) by 149 days.

(21) Appl. No.: 13/608,806

(22) Filed: Sep. 10, 2012

(65) Prior Publication Data

US 2013/0239867 A1    Sep. 19, 2013

Related U.S. Application Data

(60) Provisional application No. 61/532,799, filed on Sep. 9, 2011.

(51) Int. Cl.
*B63B 21/24* (2006.01)
*F16L 3/12* (2006.01)
*E21B 17/01* (2006.01)

(52) U.S. Cl.
CPC *F16L 3/12* (2013.01); *E21B 17/017* (2013.01)
USPC ........................................ 114/293; 405/224.2

(58) Field of Classification Search
USPC ................................ 114/293; 405/158, 224.2
See application file for complete search history.

(56) References Cited

U.S. PATENT DOCUMENTS

| | | |
|---|---|---|
| 3,142,343 A | 7/1964 | Otteman et al. |
| 3,142,344 A | 7/1964 | Otteman et al. |
| 3,352,357 A | 11/1967 | Van Eek |
| 3,605,413 A | 9/1971 | Morgan |
| 4,126,183 A | 11/1978 | Walker |
| 4,185,694 A | 1/1980 | Horton |
| 4,188,156 A | 2/1980 | Fisher et al. |
| 4,240,506 A | 12/1980 | Dareing |
| 4,248,549 A | 2/1981 | Czerewaty |
| 4,256,417 A | 3/1981 | Bohannon |
| 4,529,334 A | 7/1985 | Ortloff |
| 4,633,801 A | 1/1987 | Marshall |
| 4,740,109 A | 4/1988 | Horton |
| 4,741,647 A | 5/1988 | Dumazy et al. |
| 4,854,781 A | 8/1989 | Sparks et al. |
| 5,447,390 A | 9/1995 | Sparks et al. |
| 5,873,677 A | 2/1999 | Davies et al. |

(Continued)

OTHER PUBLICATIONS

PCT/US2012/054464 International Search Report and Written Opinion Dated Jan. 30, 2013 (9 p.).

(Continued)

*Primary Examiner* — Stephen Avila
(74) *Attorney, Agent, or Firm* — Conley Rose, P.C.

(57) ABSTRACT

An offshore system for drilling or production comprises a buoyant hull. In addition, the system comprises a topside mounted to the hull and positioned above the surface of the water. Further, the system comprises a conductor having a lower end disposed in the sea bed below the sea floor and an upper end coupled to the topside. Still further, the system comprises a bend restrictor disposed about the conductor. The bend restrictor comprises a first sleeve having a lower end positioned in the sea bed below the sea floor, an upper end positioned above the sea floor, an inner surface extending between the upper end and the lower end, an outer surface extending between the upper end and the lower end, and a slit extending helically about the first sleeve. The slit extends radially from the inner surface to the outer surface of the first sleeve.

21 Claims, 15 Drawing Sheets

(56) References Cited

U.S. PATENT DOCUMENTS

| | | | |
|---|---|---|---|
| 6,027,286 A | 2/2000 | Pollack | |
| 6,659,690 B1 | 12/2003 | Abadi | |
| 7,347,225 B2 * | 3/2008 | Nobileau | 138/114 |
| 8,430,170 B2 | 4/2013 | Pionetti | |
| 8,474,539 B2 | 7/2013 | Luo et al. | |
| 2004/0065475 A1 | 4/2004 | Laursen et al. | |
| 2008/0044233 A1 | 2/2008 | O'Sullivan | |
| 2008/0283248 A1 | 11/2008 | Askestad | |
| 2011/0178730 A1 | 7/2011 | Mangal et al. | |
| 2013/0239866 A1 | 9/2013 | Maher et al. | |

OTHER PUBLICATIONS

PCT/US2012/054429 International Search Report and Written Opinion dated Feb. 28, 2013 (11 p.).

* cited by examiner

HELICAL BEND RESTRICTOR

CROSS-REFERENCE TO RELATED APPLICATIONS

This application claims benefit of U.S. provisional patent application Ser. No. 61/532,799 filed Sep. 9, 2011, and entitled "Helical Bend Restrictor," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to subsea conductors. More particularly, the invention relates to devices to restrict subsea conductors from bending while optimizing the distribution of stresses between the device and the conductor.

2. Background of the Technology

Offshore platforms are commonly used to drill and produce subsea wells. Some offshore platforms such as jackup rigs are directly anchored to the sea floor, whereas other offshore platforms (e.g., as semi-submersibles platforms, spar platforms, and tension leg platforms) float on the sea surface and are moored to the sea floor. In both cases, various conductors such as pipes, flow lines, tendons, and the like extend from the sea floor to the platform at the sea surface. The upper end of the conductors is typically fixed to the platform and the lower end (or a lower portion of the conductor) is fixed to the sea floor or other device at the sea floor.

During offshore operations, a platform continuously moves in response to winds, waves, and currents. Since the upper ends of the conductors are secured to the platform, the portion of the conductor extending from the sea floor (or device at the sea floor) to the platform moves with the platform. Consequently, the upper portion of the conductor pivots or bends relative to the lower end or portion of the conductor secured to the sea floor. Such bending of the conductor induces undesirable stresses in the conductor that may fatigue and/or weaken the conductor over time.

Accordingly, there remains a need in the art for devices that restrict bending of subsea conductors to manage bending stresses induced in the conductors.

BRIEF SUMMARY OF THE DISCLOSURE

These and other needs in the art are addressed in one embodiment by an offshore system for drilling or production. In an embodiment, the offshore system comprises a buoyant hull. In addition, the system comprises a topside mounted to the hull and positioned above the surface of the water. Further, the system comprises a conductor having a lower end disposed in the sea bed below the sea floor and an upper end coupled to the topside. Still further, the system comprises a bend restrictor disposed about the conductor. The bend restrictor comprises a first sleeve having a lower end positioned in the sea bed below the sea floor, an upper end positioned above the sea floor, an inner surface extending between the upper end and the lower end, an outer surface extending between the upper end and the lower end, and a slit extending helically about the first sleeve. The slit extends radially from the inner surface to the outer surface of the first sleeve.

These and other needs in the art are addressed in another embodiment by a method for reducing bending stresses in a subsea conductor. In an embodiment, the method comprises penetrating the sea floor with a bend restrictor. The bend restrictor comprises a sleeve having an upper end disposed above the sea floor, a lower end disposed below the sea floor, and a helical slit extending radially through the sleeve. In addition, the method comprises extending the conductor through a bend restrictor. Further, the method comprises radially spacing the bend restrictor from the conductor. Moreover, the method comprises bending the conductor. The method also comprises restricting bending of the conductor with the bend restrictor.

These and other needs in the art are addressed in another embodiment by a bend restrictor for restricting bending of a conductor extending into the sea floor. In an embodiment, the bend restrictor comprises a sleeve disposed about the conductor. The sleeve has a lower end positioned in the sea bed below the sea floor and an upper end positioned above the sea floor. In addition, the bend restrictor comprises an annular slit extending radially through the sleeve and having a helical pitch P. The sleeve has a first portion extending from the sea floor to the upper end and a second portion extending from the sea floor to the lower end. The first portion has a first axial length and the second portion has a second axial length that is the same as the first axial length.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
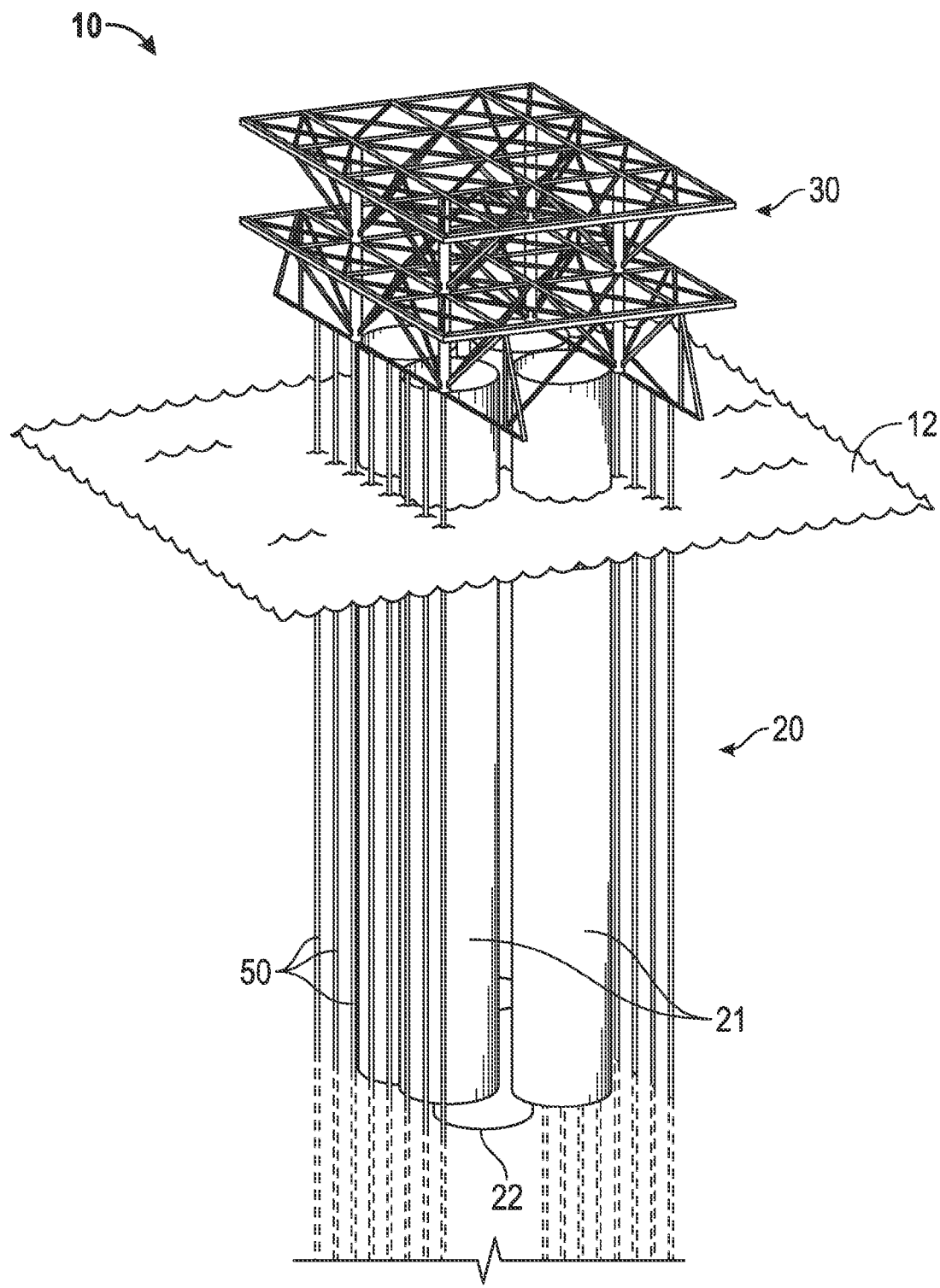
FIG. 1 is a perspective view of an embodiment of an offshore structure and a plurality of conductors extending from the sea floor to the offshore structure.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 2:
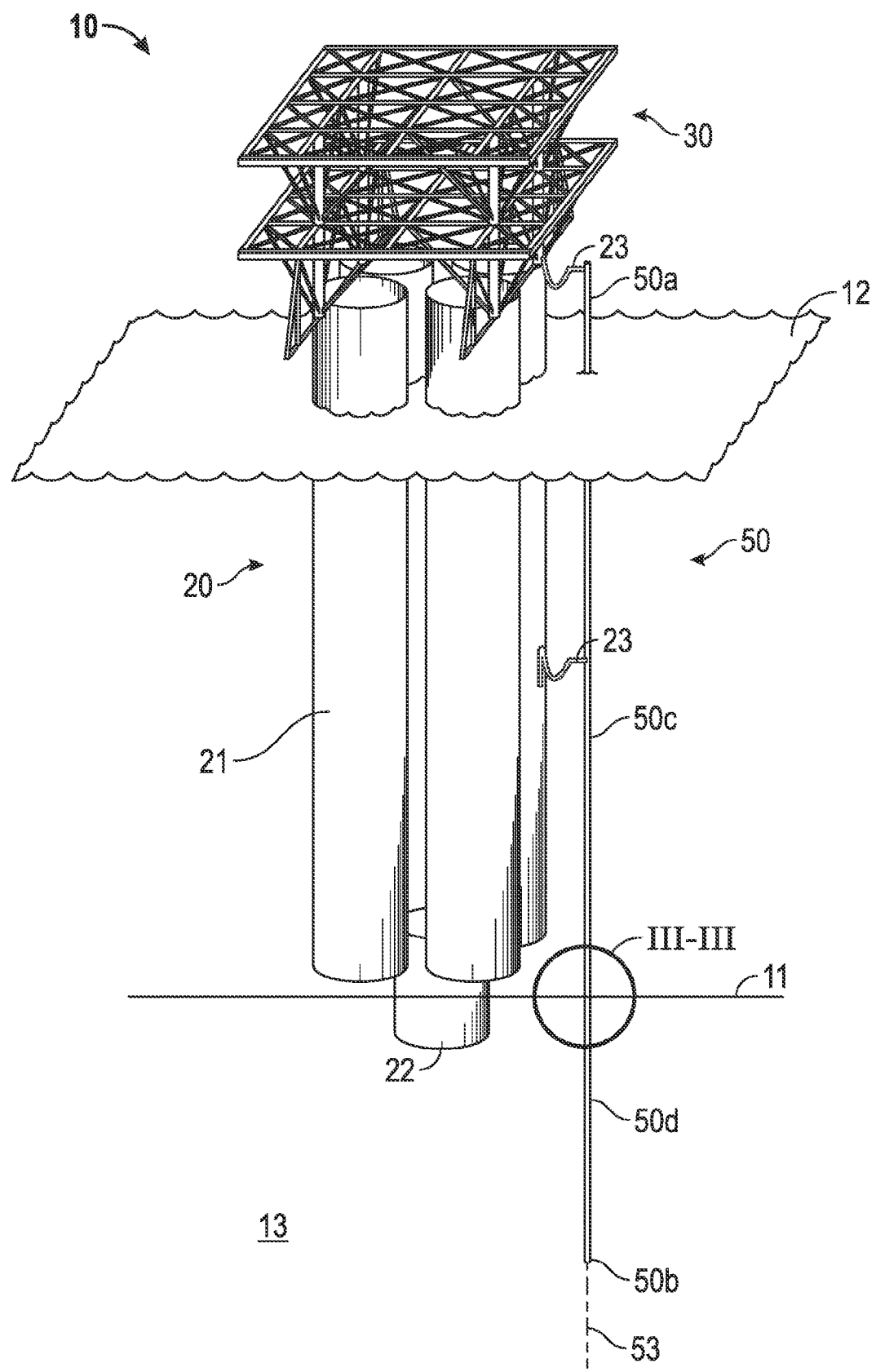
FIG. 2 is a front perspective view of the offshore structure and a single conductor of FIG. 1.

Referring now to FIGS. 1 and 2, an embodiment of an offshore structure 10 is shown. Structure 10 is configured to drill and produce hydrocarbons in an offshore environment. Structure 10 comprises a ballast adjustable hull 20 and a topside or deck 30 mounted to hull 20. Hull 20 extends from the sea floor 11 through the sea surface 12. Thus, deck 30 is positioned above the sea surface 12. Hull 20 comprises a plurality of cylindrical columns 21 coupled together and an anchor 22 (e.g., a suction pile) embedded in the sea floor 11. A plurality of conductors 50 extend from the sea floor 12 to deck 30. For purposes of clarity, only one conductor 50 is shown in FIG. 2.

In this embodiment, the exemplary offshore structure 10 shown in FIGS. 1 and 2 is a buoyant tower as disclosed in U.S. Patent Application No. 61/394,646, filed Oct. 19, 2010 and entitled "Buoyant Tower," which is hereby incorporated herein by reference in its entirety for all purposes. However, in general, structure 10 may be any offshore structure such as a semi-submersible platform, a spar platform, or a tension leg platform.

Figure 7:
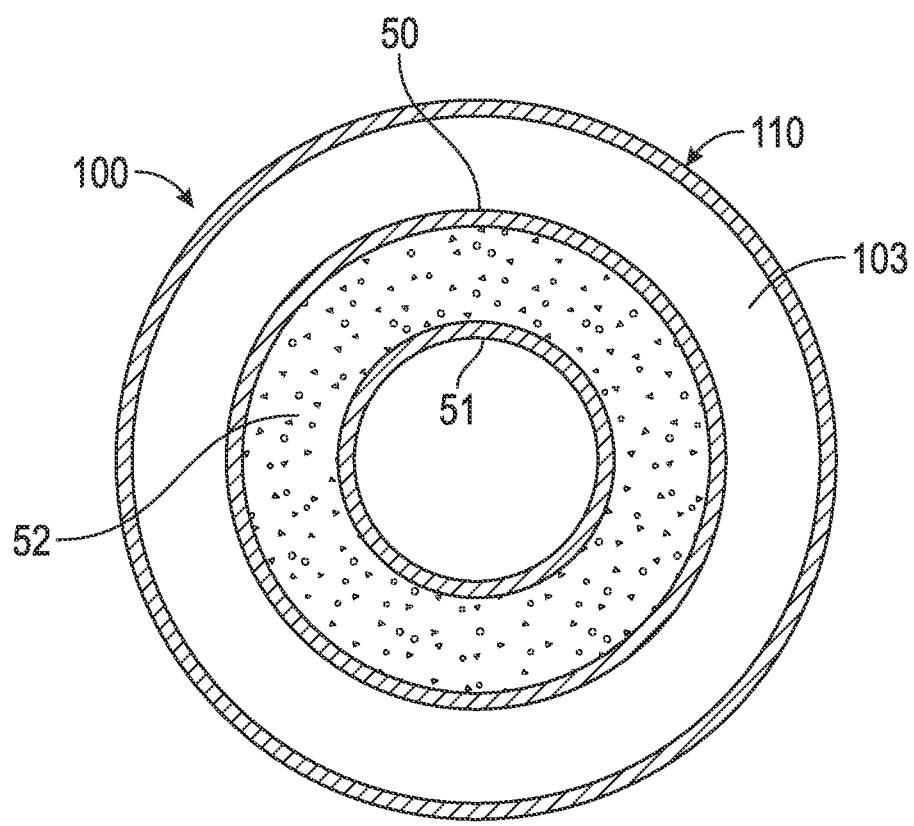
FIG. 7 is a cross-sectional view of the helical bend restrictor and the conductor of FIG. 3 taken along section VII-VII.

Referring now to FIG. 2, each conductor 50 penetrates the sea floor 11 and has a central or longitudinal axis 53, a first or upper end 50a coupled to hull 20, a second or lower end 50b opposite end 50a. Upper end 50a is disposed above the sea surface 12 and lower end 50b is disposed in the sea bed 13 (i.e., disposed below the sea floor 11). Thus, each conductor 50 may be described as having a first or upper portion 50c extending upward from the sea floor 11 to upper end 50a, and a lower portion 50d extending downward from the sea floor 11 through the sea bed 13 to lower end 50b. As best shown in FIG. 7, in this embodiment, each conductor 50 comprises at least one steel tubular 51 such as steel casing or steel riser. In FIG. 7, conductor 50 includes a pair of coaxially aligned, radially-spaced, nested tubulars 51. The radial spacing of tubulars 51 results in an annulus therebetween, which, in this embodiment, is filled with a rigid material 52. In this embodiment, material 52 is grout or cement. In general, each conductor 50 may have any outer diameter, however, for many applications (but not necessarily all applications), conductor 50 has an outer diameter between 10.0 in. and 25.0 in.

Referring again to FIG. 2, the upper portion 50c of each conductor 50 is coupled to hull 20 at several locations along its length. In particular, the upper portion 50c of each conductor 50 is coupled to hull 20 at a plurality of axially spaced locations via guide frames 23 extending laterally from hull 20. Each conductor 50 extends through each guide frame 23, which maintains the general spacing and arrangement of the plurality of conductors 50. Thus, as structure 10 moves in response to environmental loads (e.g., wind, waves, currents, etc.), the upper portion 50c of each conductor 50 moves laterally with structure 10, whereas the lower portion 50d of each conductor 50 disposed in the sea bed 13 remains fixed. Consequently, each conductor 50 bends at or near the sea floor 11 (i.e., at the intersection of portions 50c, d) as structure 10 (and upper portions 50c coupled thereto) move in response to environmental loads. Such bending induces bending stresses in each conductor 50. These stresses can lead to failures in conductors 50, either through surpassing the ultimate yield strength of the conductor or through fatigue wear. To manage bending stresses in conductors 50, a bend restrictor 100 is disposed about each conductor 50 at the sea floor 11 where bending stresses are expected to be the greatest.

Figure 3:
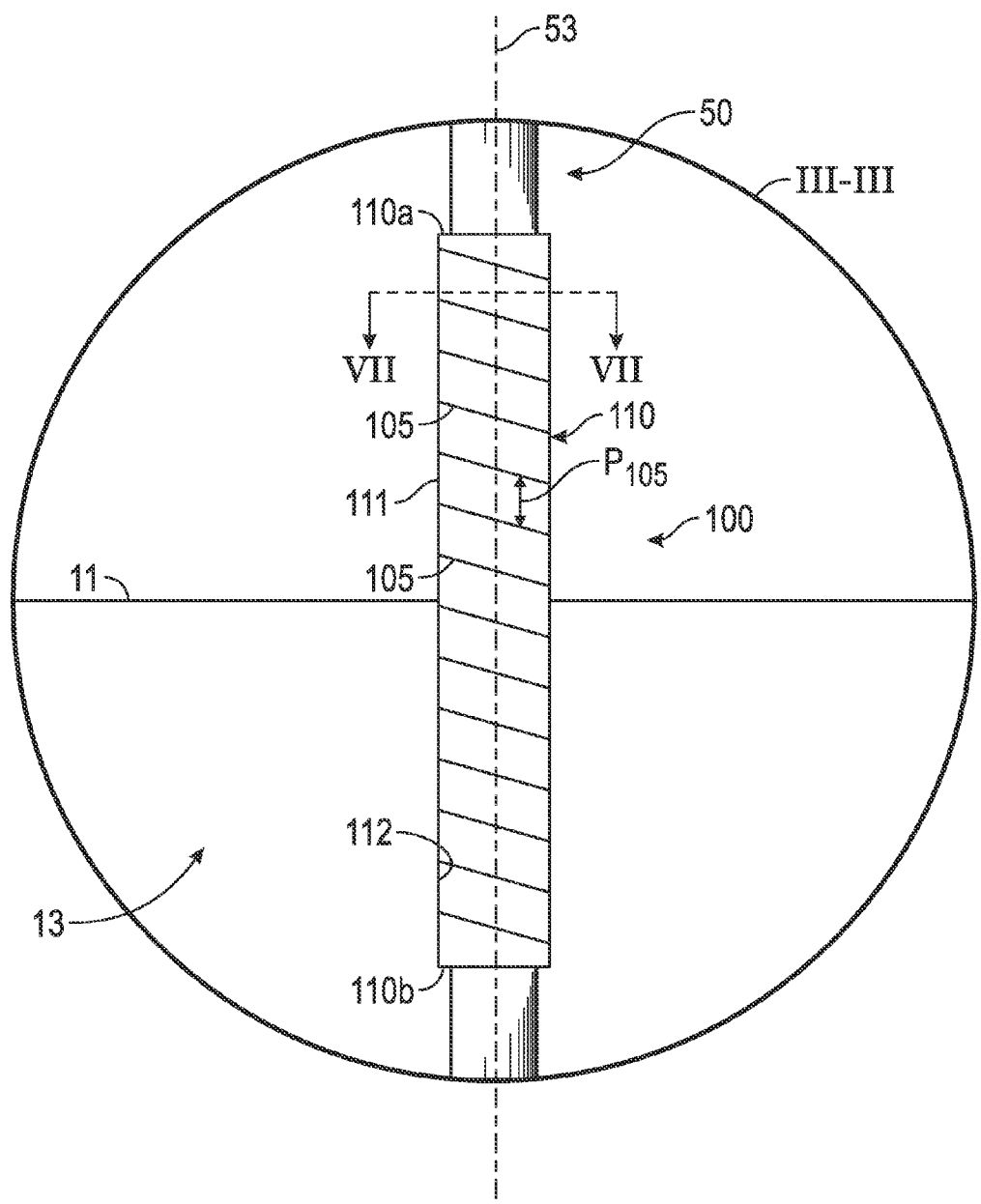
FIG. 3 is an enlarged front view of section III-III of FIG. 2 illustrating the conductor and an embodiment of a helical bend restrictor in accordance with the principles described herein disposed about the conductor.
Figure 4:
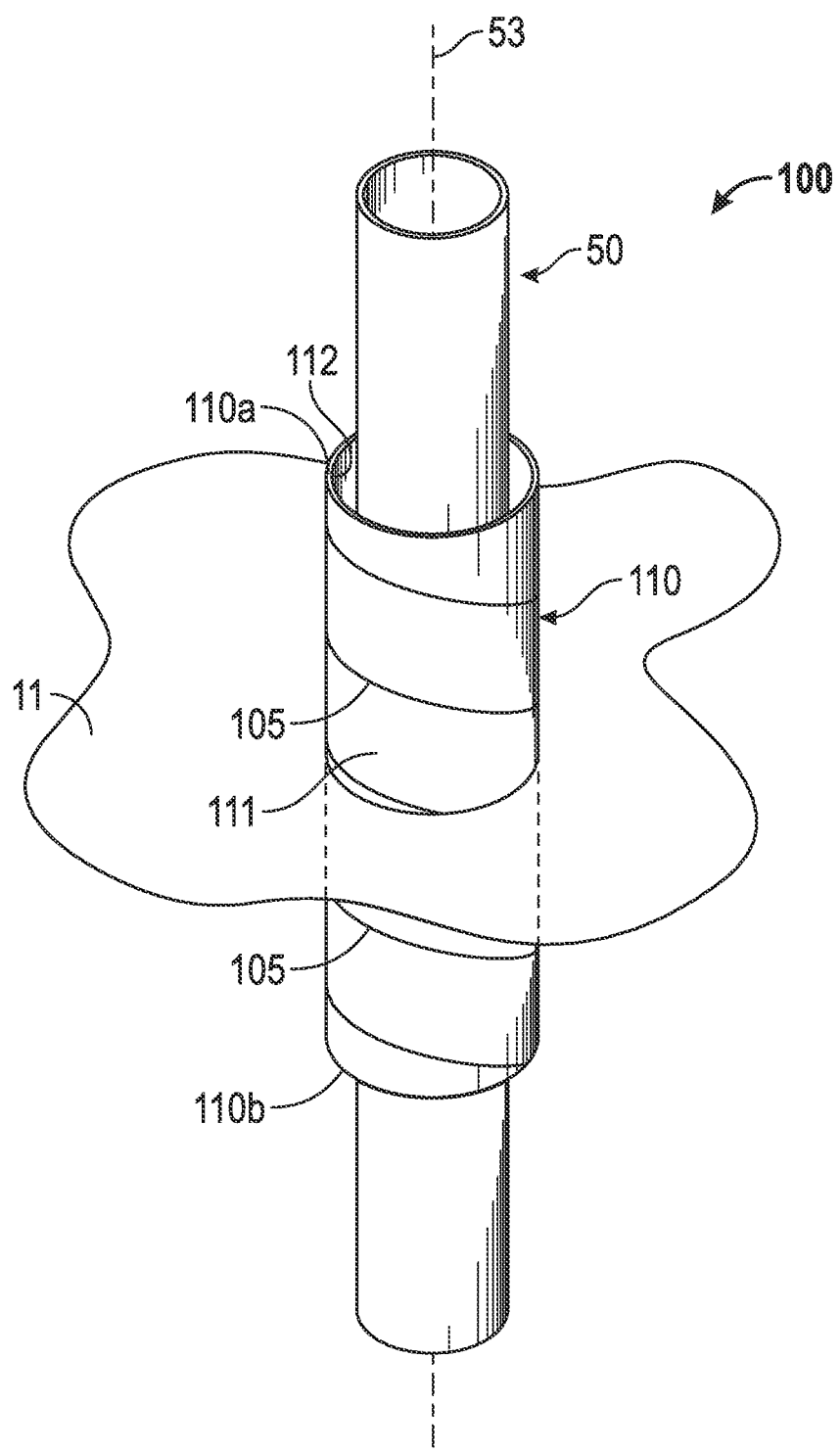
FIG. 4 is an prospective view of the helical bend restrictor and the conductor of FIG. 3.
Figure 5:
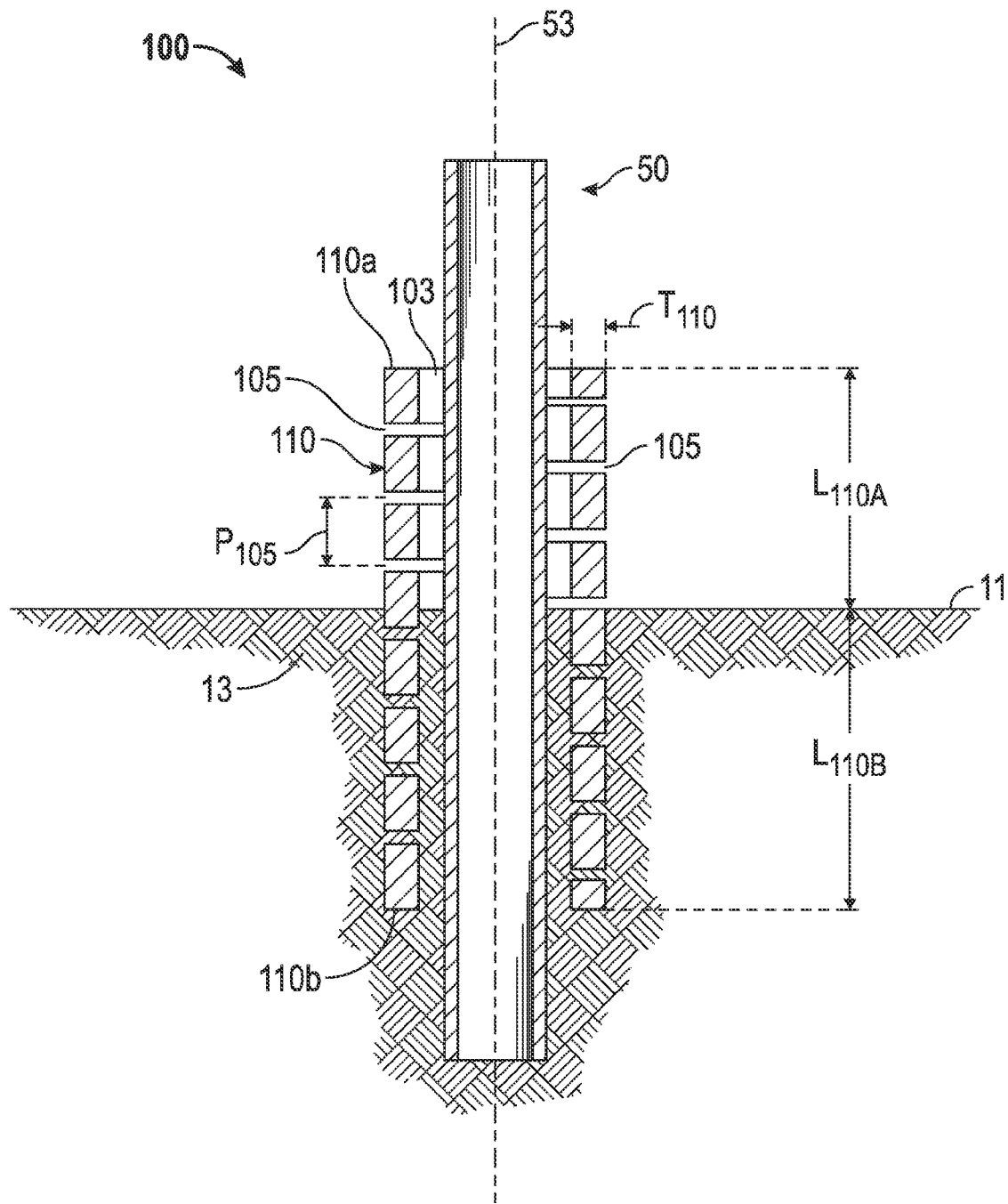
FIG. 5 is an front cross-sectional view of the helical bend restrictor and the conductor of FIG. 3.

Referring now to FIG. 3-5, one bend restrictor 100 is shown disposed about one conductor 50, it being understood that one bend restrictor 100 is disposed about each conductor 50. In general, each bend restrictor 100 functions to strengthen the associated conductor 50 at the sea floor 11 (i.e., at the location where conductor 50 is subjected to the greatest bending stress). One bend restrictor 100 will now be described it being understood that each bend restrictor 100 is the same.

Figure 6:
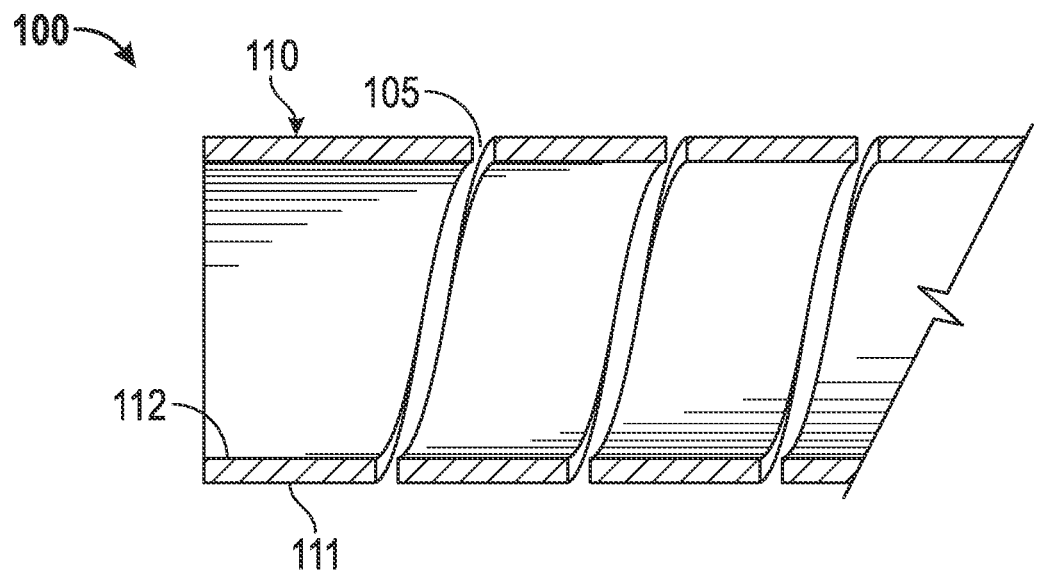
FIG. 6 is an enlarged partial front cross-sectional view of the helical bend restrictor of FIG. 3.

In this embodiment, bend restrictor 100 comprises a cylindrical sleeve 110 disposed about conductor 50. In particular, sleeve 110 is coaxially aligned with conductor 50 and has a first or upper end 110a disposed above the sea floor 11, a second or lower end 110b disposed below the sea floor 11 (i.e., disposed in the sea bed 13), a cylindrical outer surface 111 extending between ends 110a, b, and a cylindrical inner surface 112 extending between ends 110a, b. In addition, sleeve 110 includes a slit or cut 105 extending helically about sleeve 110 and axis 53 from upper end 110a to lower end 110b. Slit 105 has a pitch $P_{105}$ equal to the axial length (center-to-center) of one complete turn of helical slit 105. In this embodiment, pitch $P_{105}$ is constant along the entire axial length of sleeve 110. As is best shown in FIG. 6, helical slit 105 extends radially through restrictor 100 from outer surface 111 to inner surface 112.

As best shown in FIG. 5, a first or upper portion of sleeve 110 has a length $L_{110A}$ measured axially from the sea floor 11 to upper end 50a, and a second or lower portion of sleeve 110 has a length $L_{110B}$ measured axially from the sea floor 11 to lower end 110b. Thus, the total axial length of sleeve 110, and hence bend restrictor 100, is the sum of lengths $L_{110A}$, $L_{110B}$. Sleeve 110 has a thickness $T_{110}$ measured radially between surfaces 111, 112. In this embodiment, thickness $T_{110}$ is constant and uniform moving axially between ends 110a, b.

Referring to FIGS. 5 and 7, the inner diameter of sleeve 110 is greater than the outer diameter of conductor 50, thereby resulting in an annulus 103 disposed radially between sleeve 110 and conductor 50. In this embodiment, annulus 103 is filled with sea water above the sea floor 11 and soil below the sea floor 11. However, in other embodiments, the annulus (e.g., annulus 103) can be filled with other materials such as rigid materials (e.g., grout or concrete) or resilient materials (e.g., elastomeric materials).

In general, the size and geometry of sleeve 100 (e.g., thickness $T_{110}$, total length and lengths $L_{110A}$, $L_{110B}$, outer diameter and inner diameter, etc.) and the size of annulus 103 will depend on the particular application, and are generally chosen based on a variety of factors including, without limitation, environmental conditions, the desired combined stiffness of the conductor 50 and bend restrictor 100, the Young's modulus of bend restrictor 100 and the conductor 50, and the dimensions of the conductor 50 and bend restrictor 100. For most applications, axial lengths $L_{110A}$, $L_{110B}$ of sleeve 110 are each preferably between 10 and 100 ft., more preferably between 20 and 75 ft., and even more preferably 50 ft. Additionally, the axial length $L_{110A}$ is preferably about the same as the axial length $L_{110B}$. Further, the radial thickness $T_{110}$ of sleeve 110 is preferably between 0.25 in. and 3 in., and more preferably between 0.5 in. and 2.5 in.

Figure 8:
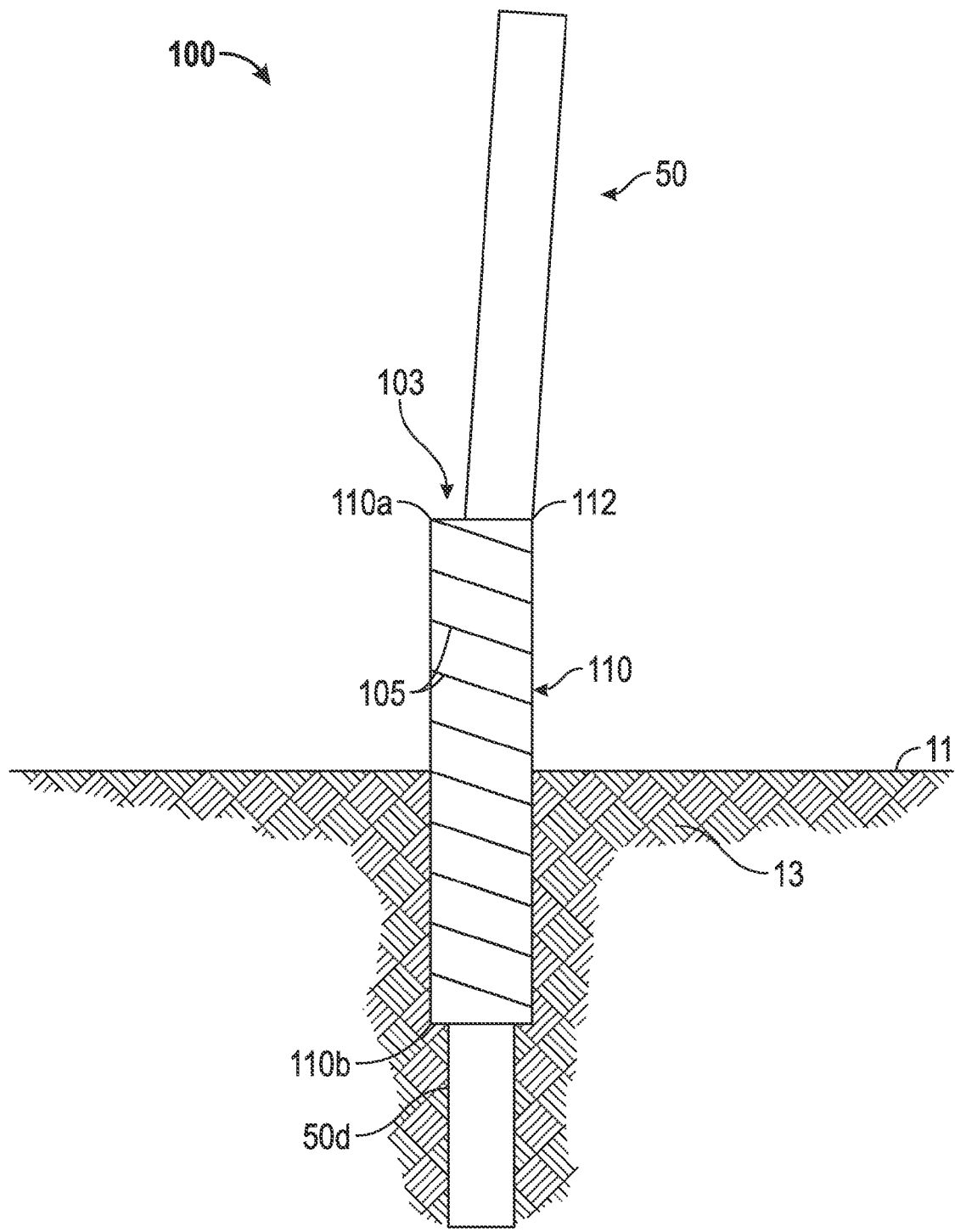
FIGS. 8 and 9 are a front schematic view of the helical bend restrictor and the conductor of FIG. 3 experiencing bending stresses.
Figure 9:
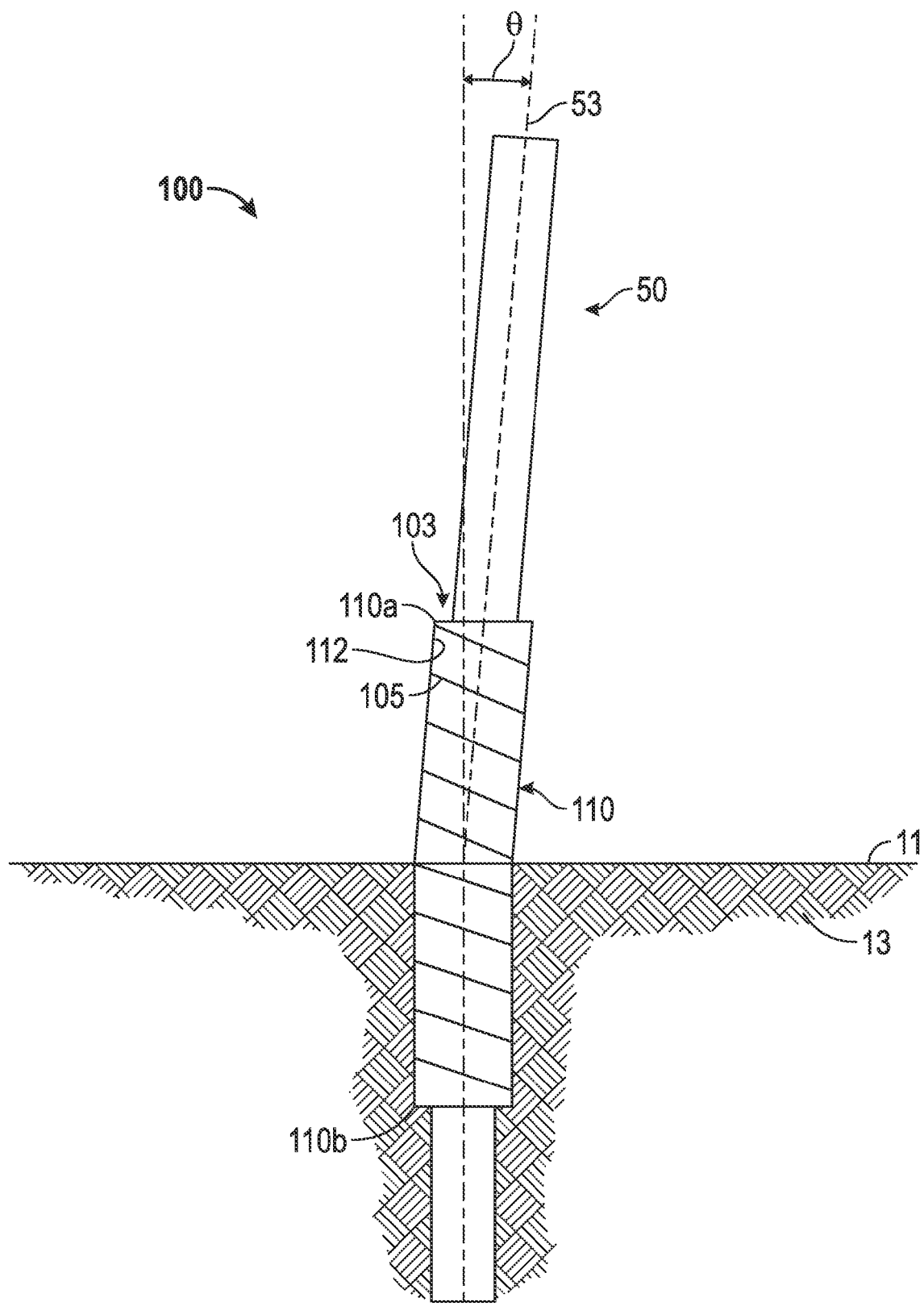

Referring now to FIGS. 8 and 9, a schematic view of one restrictor 100 is shown restricting the bending of the associated conductor 50. As conductor 50 bends at or near the sea floor 11 in response to movement of structure 10, bend restrictor 100 provides added support and stability to conductor 50 at the region of bending. As a result, restrictor 100 restricts further bending of conductor 50 and offers the potential to reduce bending stresses experienced by the conductor 50. More specifically, as conductor 50 bends from vertical by an angle θ in response to the movements of structure 10, the presence of annulus 103 between conductor 50 and sleeve 110 enables conductor 50 to bend on its own within sleeve 110 until conductor 50 engages sleeve 110. Since upper portion 50c of conductor 50 bends relative to lower portion 50d of conductor 50 (at or near the sea floor 11), conductor 50 will typically first contact the inner surface 112 of sleeve 110 at or near end 110a. Before engagement of conductor 50 and sleeve 110, bending of conductor 50 only induces bending stresses in conductor 50—since sleeve 110 is not bending, it does not experience bending stresses.

As is best shown in FIG. 9, once conductor 50 engages the inner surface 112 of sleeve 110 at end 110a, continued bending of conductor 50 requires bending of both conductor 50 and sleeve 110. Thus, once conductor 50 engages sleeve 110, the bending stresses are effectively shared by conductor 50 and sleeve 110. The stiffness of sleeve 110 functions to limit further bending (and hence limit bending stresses) experienced by the corresponding conductor 50. It should be appreciated that helical slit 105 in sleeve 110 does slightly enhance the flexibility of sleeve 110 and allows sleeve 110 to bend with conductor 50 at sufficiently high loads. In other words, slit 105 in sleeve 110 allows sleeve 110 to operate similar to a stiff resilient spring.

Referring again to FIGS. 8 and 9, without being limited by this or any particular theory, the maximum bending stresses in conductor 50 (i.e., maximum tensile stress and maximum compressive stress) are located at or near the sea floor 11 (i.e., at or near the pivot point of bending of conductor 50). As is best shown in FIG. 9, after engagement of conductor 50 and sleeve 110, further bending of conductor 50 increases bending stresses in conductor 50 as well as induces bending stresses in sleeve 110 since sleeve 110 is forced to bend along with conductor 50, thereby resulting in angle θ described above. At sufficiently high bending stresses, sleeve 110 will bend and flex, thereby alleviating stresses at the contact interface of conductor 50 and sleeve 110.

Figure 10:
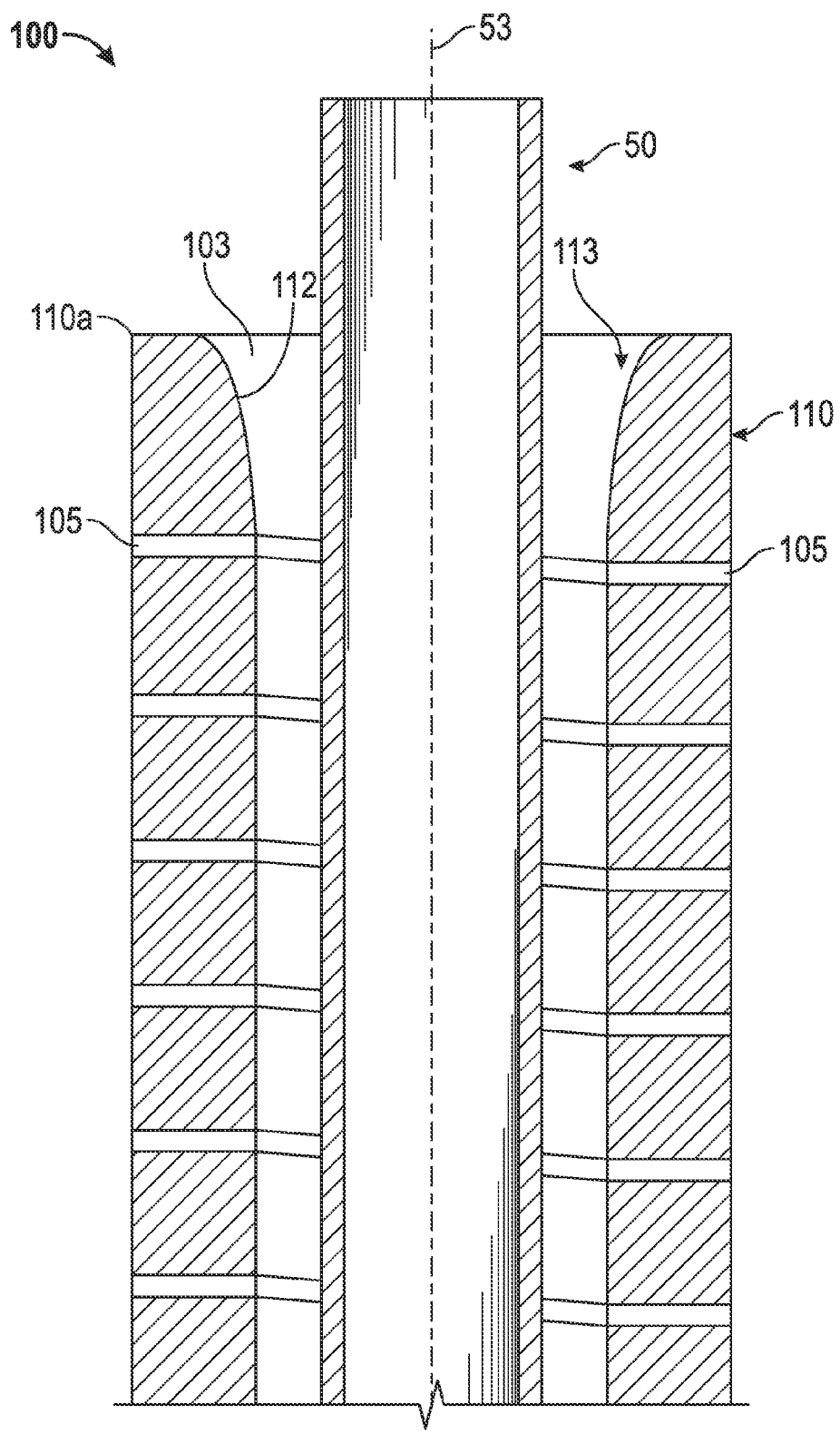
FIG. 10 is a partial cross-sectional view of a conductor and an embodiment of a helical bend restrictor in accordance with the principles described herein disposed about the conductor.
Figure 11:
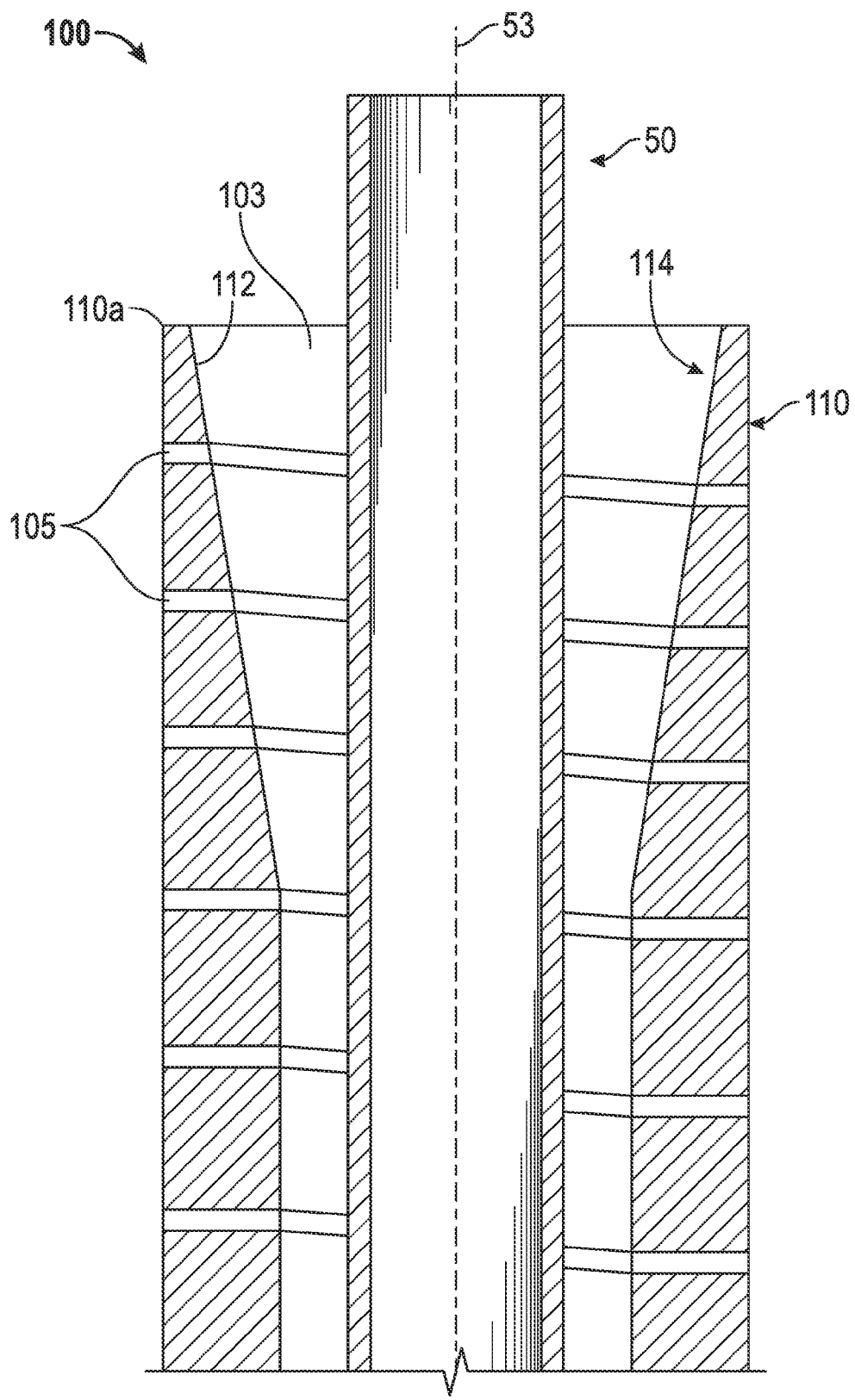
FIG. 11 is a partial cross-sectional view of a conductor and an embodiment of a helical bend restrictor in accordance with the principles described herein disposed about the conductor.
Figure 12A:
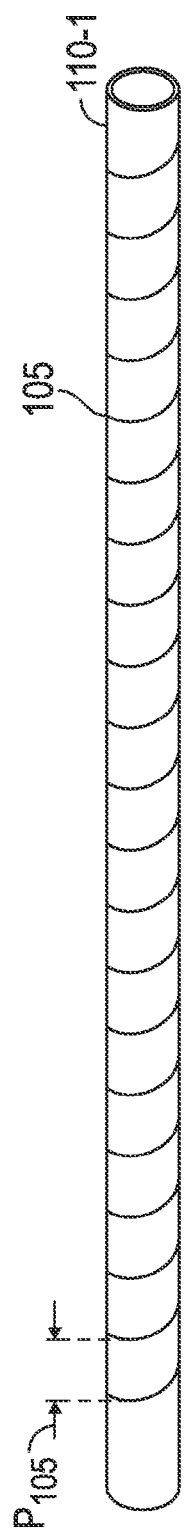
FIGS. 12A-12E are side views of embodiments of helical bend restrictors in accordance with the principles described herein having different stiffnesses.
Figure 12B:
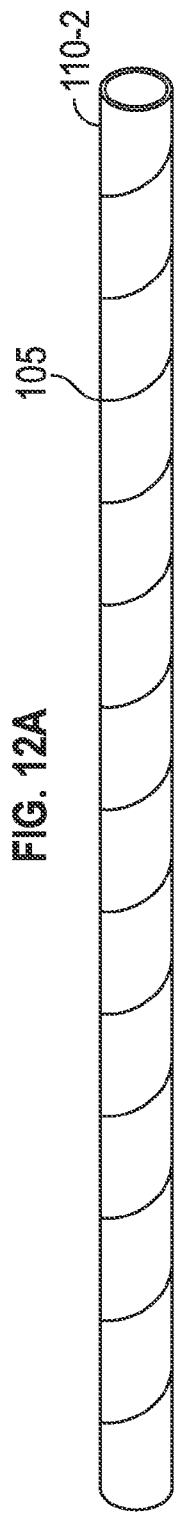
Figure 12C:
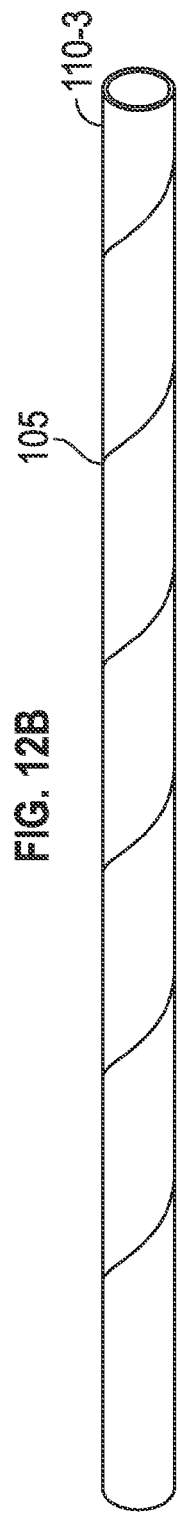
Figure 12D:
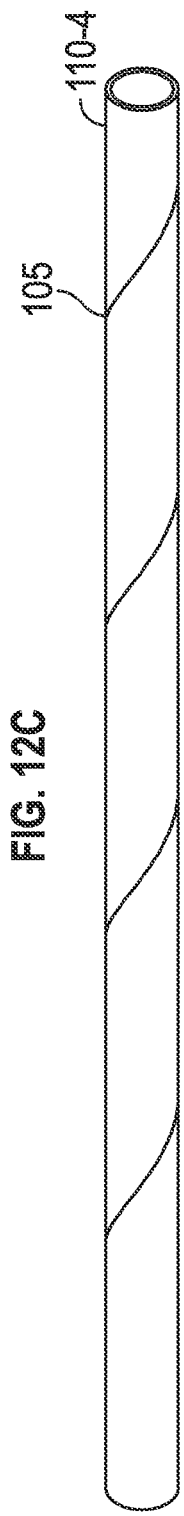
Figure 12E:
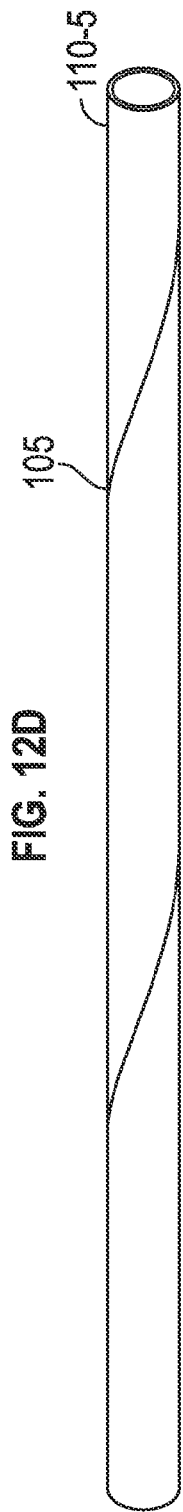

Referring now to FIGS. 10 and 11, in embodiments where annulus 103 is not filled with cement 52 or other rigid material, conductor 50 is free to bend on its own within sleeve 110 until conductor 50 engages inner surface 112 of sleeve 110. As previously described, since upper portion 50c of conductor 50 bends relative to lower portion 50d of conductor 50 (at or near the sea floor 11), conductor 50 will typically first contact the inner surface 112 of sleeve 110 at or near upper end 110a. Once conductor 50 engages the inner surface 112 of sleeve 110, continued bending of conductor 50 requires bending of both conductor 50 and sleeve 110. To reduce bending stresses and the potential for kinking of conductor 50 upon engagement of upper end 110a, the contact surface area between conductor 50 and end 110a are preferably maximized to minimize and/or eliminate sharp edges at the point of contact between sleeve 110 and conductor 50. In particular, in such embodiments, inner surface 112 at upper end 110a of sleeve 110 preferably comprises a smoothly contoured convex annular surface 113 as is shown in FIG. 10, or a frusto-conical surface 114 as is shown in FIG. 11.

Referring again generally to FIG. 5, the size and geometry (e.g., axial length, radial thickness, inside diameter, etc.) of restrictor 100, the pitch $P_{105}$ of slit 105, and the material composition of restrictor 100 (e.g., steel, aluminum, composite, etc.) are preferably selected to reduce the maximum bending stresses in conductor 50 (as compared to the unrestricted bending of conductor 50) while simultaneously maintaining the maximum bending stresses induced in restrictor 100 below the ultimate material strength of restrictor 100. Without being limited by this or any particular theory, the maximum bending stresses in conductor 50 and restrictor 100 depend, at least in part, on the movement of structure 10, which depends on the maximum environmental loads exerted on structure 10 (e.g., wind, wave, and current loads). There are several techniques or methods for adjusting the stiffness of bend restrictor 100. These methods generally include, but are not limited to, altering the geometry of sleeve 110 (e.g., radial thickness, length $L_{110A}$, $L_{110B}$, diameter, etc.), varying the pitch $P_{105}$ of slit 105, and selecting a different material (i.e., Young's modulus) for restrictor 100. In general, the greater the radial thickness of sleeve 110, the greater its stiffness; the greater the diameter of sleeve 110, the greater its stiffness; the lower the pitch $P_{105}$ of slit 105, the greater the stiffness of sleeve 110, and the greater the Young's modulus of the material used to form sleeve 110, the greater the stiffness of sleeve 110. Thus, the stiffness of bend restrictor 100 can be tailored for a desired stiffness profile and dynamic response to anticipated environmental conditions.

Referring to FIGS. 12A-12E, slit 105 of each exemplary sleeve 110-1, 110-2, 110-3, 110-4, 110-5, respectively, has a pitch $P_{105}$ as previously described. Each sleeve 110-1, 110-2, 110-3, 110-4, 110-5 has the same size and geometry (e.g., inner diameter, outer diameter, length, radial thickness, etc.), and pitch $P_{105}$ of each sleeve 110-1, 110-2, 110-3, 110-4, 110-5 is constant and uniform along its length. However, the pitch $P_{105}$ of slits 105 is different among different sleeves 110-1, 110-2, 110-3, 110-4, 110-5. In general, pitch $P_{105}$ of slit 105 in sleeve 110-1 is less than pitch $P_{105}$ of slit 105 in sleeve 110-2, which less than pitch $P_{105}$ of slit 105 in sleeve 110-3, which less than pitch $P_{105}$ of slit 105 in sleeve 110-4, which less than pitch $P_{105}$ of slit 105 in sleeve 110-5. In general, the greater the pitch $P_{105}$ of slit 105, the greater the stiffness of the corresponding sleeve 110. Thus, sleeve 110-5 is stiffer than sleeve 110-4, which is stiffer than sleeve 110-3, and so on. Therefore, it is possible to tailor the stiffness of bend restrictor 100 by altering the pitch $P_{105}$ of the slit 105 without needing to change other parameters such as the material, the length, or the thickness of sleeve 110.

Figure 13A:
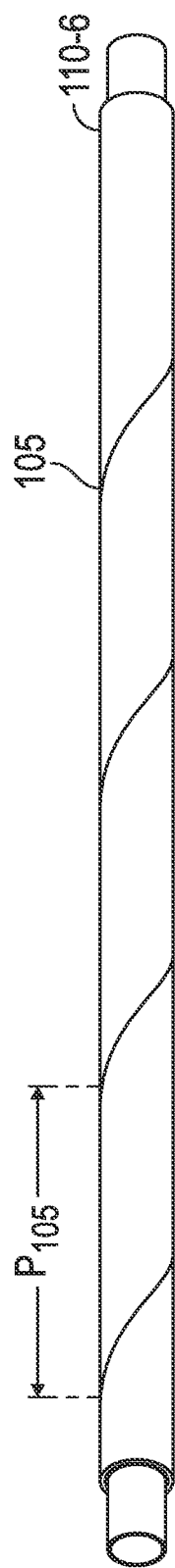
FIGS. 13A and 13B are side views of embodiments of helical bend restrictors in accordance with the principles described herein having stiffnesses that vary along their lengths.
Figure 13B:
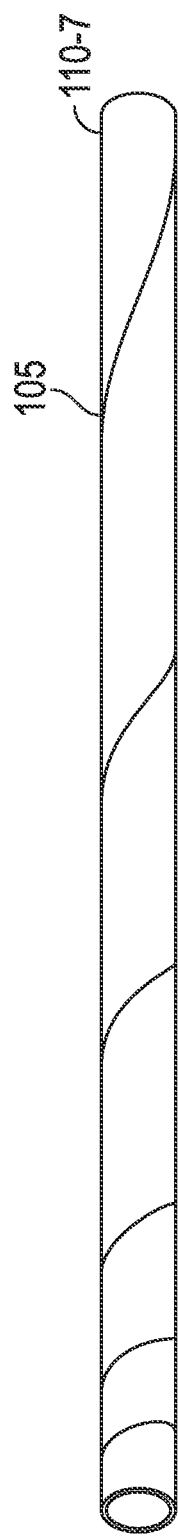

Referring now to FIGS. 13A and 13B, in addition to being able to tailor the overall stiffness of restrictor 100 by adjusting the pitch $P_{105}$ of slit 105, it is further possible to adjust pitch $P_{105}$ such that the stiffness of restrictor 100 varies along its length. For example, in FIG. 13A, slit 105 of exemplary sleeve 110-6 has a uniform pitch $P_{105}$, and thus, a uniform stiffness along its length. However, in FIG. 13B, slit 105 of exemplary sleeve 110-7 has a pitch $P_{105}$ that changes along the length of sleeve 110-7. In particular, pitch $P_{105}$ increases moving from the left to right along sleeve 110-7 in FIG. 13B. By adjusting the pitch $P_{105}$ of the slit 105, it is possible to tailor and vary the stiffness of the restrictor 100 along its length. In general, the pitch $P_{105}$ of slit 105 is preferably varied and controlled such that portions of bend restrictor 100 that engage conductor 50 are less stiff, while other portions of bend restrictor 100 remain stiff, particularly in areas where the bending stresses are at a maximum (e.g., at or near the sea floor 11).

Figure 14:
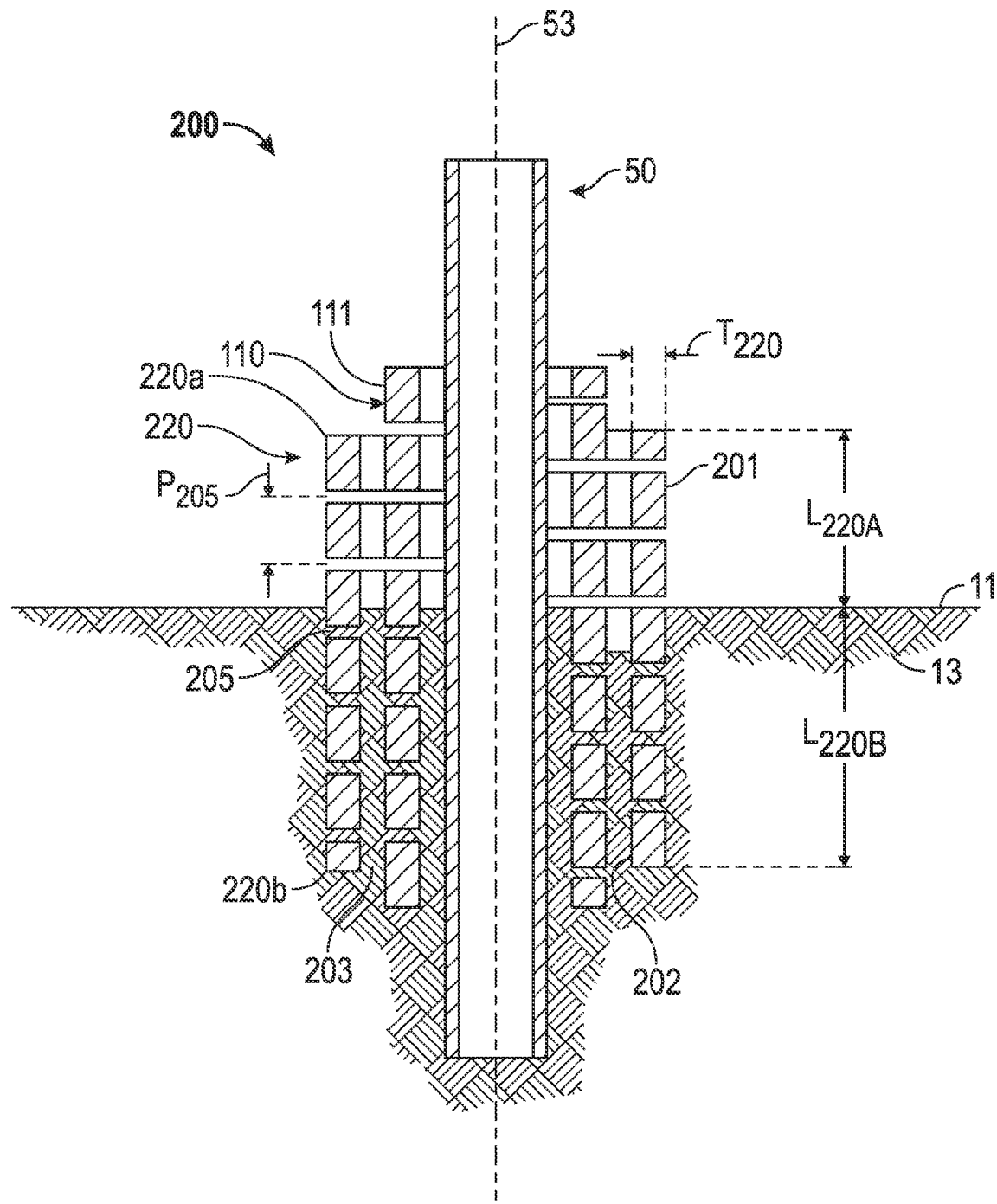
FIG. 14 is a cross-sectional front view of an embodiment of a bend restrictor in accordance with the principles described herein.

Referring first to FIG. 14, bend restrictor 200 is shown disposed about one conductor 50 to strengthen conductor 50 at the sea floor 11 (i.e., at the location where conductor 50 is subjected to the greatest bending stress). Bend restrictor 200 comprises cylindrical sleeve 110 disposed about conductor 50, each as previously described. However, in this embodiment, restrictor 200 also includes a second or outer cylindrical sleeve 220 disposed about sleeve 110. Outer sleeve 220 is coaxially aligned with sleeve 110 and conductor 50 and has a first or upper end 220a disposed above the sea floor 11, a second or lower end 220b disposed below the sea floor 11 (i.e., disposed in the sea bed 13), a cylindrical outer surface 201 extending between ends 220a, b, and a cylindrical inner surface 202 extending between ends 220a, b. In addition, sleeve 220 has a first portion extending between the sea floor 11 and upper end 220a having a first axial length $L_{220A}$, a second portion extending between sea floor 11 and lower end 220b having a second axial length $L_{220B}$, and a radial thickness $T_{220}$ measured radially between surfaces 201, 202.

Further, sleeve 110 includes a slit or cut 205 extending helically about sleeve 220 and axis 53 from upper end 220a to lower end 220b. Slit 105 has a pitch $P_{205}$ equal to the axial length (center-to-center) of one complete turn of helical slit 205. In this embodiment, pitch $P_{205}$ is constant along the entire axial length of sleeve 220. Helical slit 205 extends radially through restrictor 200 from outer surface 201 to inner surface 202.

In this embodiment, the inner diameter of sleeve 220 is greater than the outer diameter of sleeve 110, and thus, an annulus 203 is formed between the outer surface 111 of sleeve 110 and the inner surface 202 of sleeve 220. Annulus 203 is filled with cement or grout 52; however, in other embodiments, annulus 203 may be left substantially empty or filled with other materials as described above with respect to annulus 103. Although an annulus 203 is provided between sleeves 110, 220 in this embodiment, in other embodiments, the inner diameter of sleeve 220 and outer diameter of sleeve 110 may be sized such that surfaces 202, 111 slidingly engage (i.e., there is no annulus between sleeves 110, 220).

For most applications, axial lengths $L_{220A}$, $L_{220B}$ of sleeve 220 are each preferably between 10 and 100 ft., more preferably between 20 and 75 ft., and even more preferably 50 ft. The axial length $L_{220A}$ is preferably about the same as the axial length $L_{220B}$, but such symmetry is not required under the general principles of the current invention. Further, radial thickness $T_{220}$ of sleeve 220 is preferably between 0.25 in. and 3 in., and more preferably between 0.5 in. and 2.5 in. However, $T_{220}$ may exist above or below these stated values while still substantially complying with the principles of the current invention. Additionally, in the embodiment shown, the axial length of sleeve 220 is smaller than the axial length of sleeve 110, however such an arrangement is not required.

As previously described, conductor 50 bends at or near the sea floor 11 in response to movement of structure 10. As conductor 50 bends, restrictor 200 provides added support and stability to conductor 50 at the region of bending, thereby restricting conductor 50 from bending and offering the potential to reduce bending stresses in conductor 50. Outer sleeve 220 provides some added stiffness at or nearest to the pivot point of conductor 50 (i.e. at or near the sea floor 11). Specifically, as conductor 50 bends in response to the movements of structure 10, the bending stresses experienced by conductor 50 are counteracted by the combined stiffness of the sleeve 110 and outer sleeve 220. Because both conduit 50 and restrictor 200 are fixed at the sea floor 11, the bending stresses will reach a maximum value at this point. In order to effectively alleviate this heightened stress, restrictor 200 provides a greater level of stiffness at or near the sea floor 11 of conductor 50 by providing outer sleeve 220 about sleeve 110 at or near this pivot point. Therefore, the current embodiment allows for the stiffness of restrictor 200 to be varied along its axial length such that it is greatest at the point in which the conductor 50 experiences the highest bending stresses.

Figure 15:
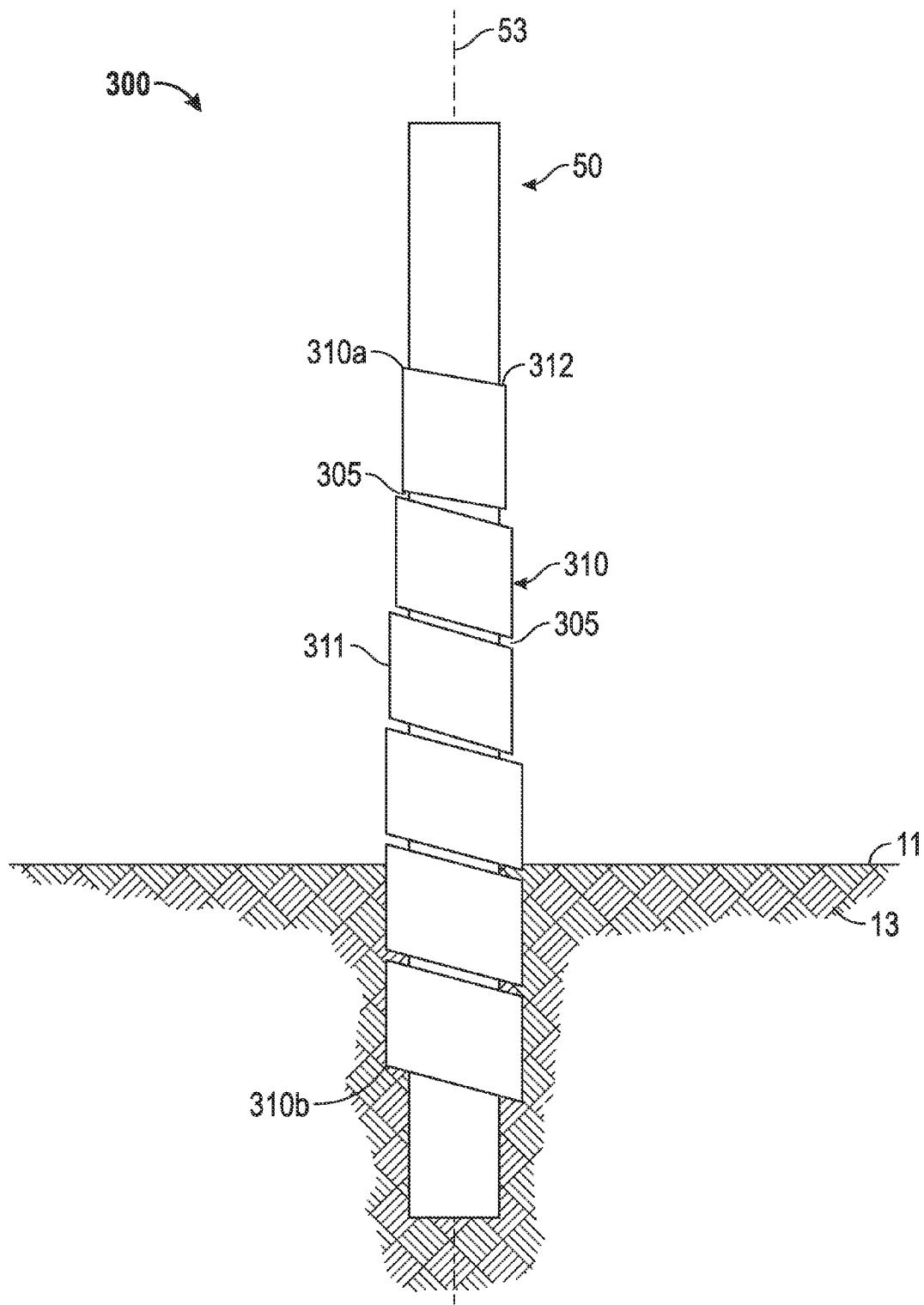
FIG. 15 is a front view of a conductor and an embodiment of a helical bend restrictor in accordance with the principles described herein disposed about the conductor.

Referring now to FIG. 15, an embodiment of a bend restrictor 300 is shown disposed about one conductor 50 to support and reduce bending stresses in conductor 50 at the sea floor 11 (i.e., at the location where conductor 50 is subjected to the greatest bending stress). In this embodiment, bend restrictor 300 is similar to bend restrictor 100 previously described and shown in FIGS. 3-5. Namely, bend restrictor 300 comprises a substantially cylindrical sleeve 310 disposed about conductor 50. Sleeve 310 has a first or upper end 310a disposed above the sea floor 11, a second or lower end 310b disposed below the sea floor 11 in the sea bed 13, a substantially cylindrical outer surface 311 extending between ends 310a, b, and a substantially cylindrical inner surface 312 extending between ends 310a, b. In addition, sleeve 310 includes a slit or cut 305 extending helically about sleeve 310 and axis 53 between ends 310a, b. Helical slit 305 extends radially through sleeve 310 from outer surface 311 to inner surface 312. Additionally, sleeve 310 has a radial thickness $T_{310}$ measured radially between surfaces 311, 312. Radial thickness $T_{310}$ remains substantially constant along the entire axial length of sleeve 310. However, unlike bend restrictor 100, in this embodiment, sleeve 310 has an inner diameter that varies along the axial length of sleeve 310. In particular, the inner diameter of sleeve 310 is maximum at end 310b, and steadily decreases to a minimum at end 310a. Thus, inner surface 312 tapers radially inward moving from end 310b to end 310a. At upper end 310a, inner surface 312 engages conductor 50.

Radial thickness $T_{310}$ is constant along the length of sleeve 310, and thus, the outer diameter of sleeve 310 decreases moving from end 310b to end 310a, and outer surface tapers radially inward parallel to inner surface 312 moving from end 310b to end 310a. Therefore, in the embodiment shown, restrictor 300 is in constant contact with conductor 50 at or near end 310a of sleeve 310.

During operation, as conduit 50 bends due to the movement of structure 10, restrictor 300 counteracts any bending stresses being experienced by conductor 50. Because sleeve 310 is already in direct contact with the outer surface of conductor 50, restrictor 300 is always counteracting any bending stresses being experienced by conductor 50 such that conductor 50 is never allowed to bend freely.

Figure 16:
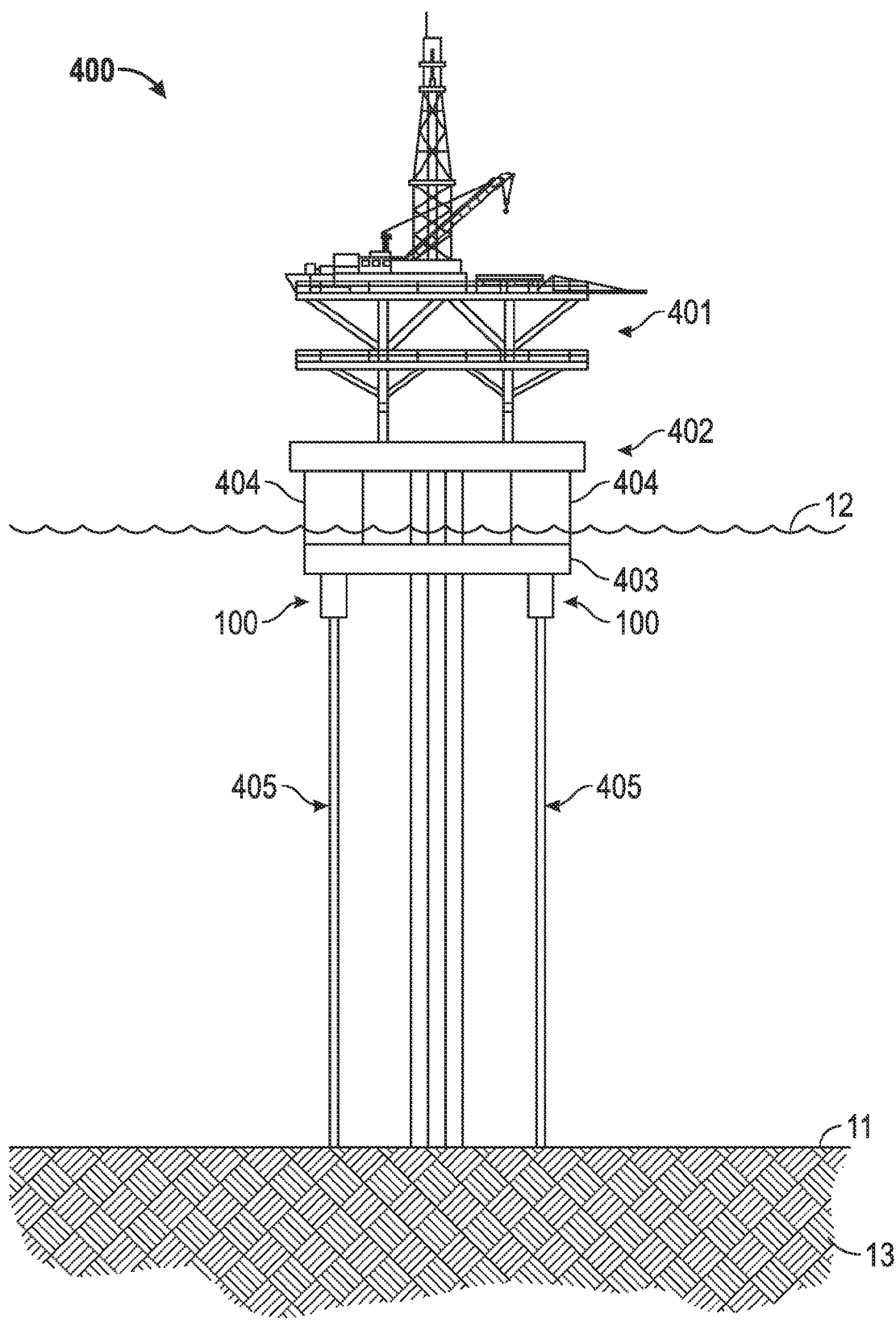
FIG. 16 is a schematic view of an offshore tension leg platform employing embodiments of helical bend restrictors in accordance with the principles described herein to manage bending stresses in the tendons.

Although embodiments described herein have been shown in connection with conductors (e.g., conductors 50), it should be appreciated that embodiments of bend restrictors described herein may be used in connection with other types of conduits, tubulars, and conductors subjected to bending loads. For example, referring to FIG. 16, restrictor 100 is disposed about the upper ends of tendons 405 of a tension leg platform 400. Tension-Leg Platform 400 ("TLP 400") generally comprises a deck 401 supported above the sea surface 12 on a buoyant hull 402. In this embodiment, hull 402 comprises an adjustably buoyant horizontal base 403 disposed below the sea surface 12 and a plurality of adjustably buoyant columns 404 extending vertically from base 403 through the sea surface 12 to deck 401. Additionally, TLP 400 includes a plurality of tendons 405, which are coupled to hull 402, secured to the sea floor 11, and placed in tension. As a result, tendons are fixed at both the sea floor 11 and at the point where tendons are coupled to hull 402.

In the embodiment shown, a bend restrictor 100 is shown disposed around each of the plurality of tendons 405 and each is similarly coupled or fixed to hull 402. As previously described for the embodiment shown in FIGS. 8 and 9, as each of the plurality of tendons 402 bends at or near their respective points of contact with hull 402 in response to movement of TLP 400, bend restrictors 100 provide added support and stability to the plurality of tendons 405 at the region of bending, thereby restricting each of the plurality of tendons 405 from bending and offering the potential to reduce bending stresses in the tendons 405.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simply subsequent reference to such steps.

What is claimed is:

1. An offshore system for drilling production, the system comprising:
   a buoyant hull;
   a topside mounted to the hull and positioned above the surface of the water;
   a conductor having a lower end disposed in the sea bed below the sea floor and an upper end coupled to the topside;
   a bend restrictor disposed about the conductor, wherein the bend restrictor comprises a first sleeve having a lower end positioned in the sea bed below the sea floor, an upper end positioned above the sea floor, an inner surface extending between the upper end and the lower end, an outer surface extending between the upper end and the lower end, and a slit extending helically about the first sleeve;
   wherein the slit extends radially from the inner surface to the outer surface of the first sleeve, and
   wherein the slit has a helical pitch P that varies along the slit.

2. The offshore system of claim 1, wherein the slit extends from the upper end to the lower end of the first sleeve.

3. The offshore system of claim 1, wherein the helical pitch P of the slit decreases moving towards the upper end of the first sleeve.

4. The offshore system of claim 1, wherein the conductor has an outer diameter that is less than an inner diameter of the first sleeve.

5. The offshore system of claim 1, wherein the inner surface of the first sleeve engages the conductor at the upper end of the first sleeve.

6. The offshore system of claim 1, wherein the bend restrictor includes a first portion extending from the sea floor to the upper end and a second portion extending from the sea floor to the lower end, wherein the first portion has a first axial length and the second portion has a second axial length that is the same as the first axial length.

7. The offshore system of claim 3, wherein the bend restrictor is made of steel, aluminum, or titanium.

8. The offshore system of claim 1, wherein the bend restrictor further comprises a second sleeve disposed about the first sleeve.

9. The offshore system of claim 8, wherein the second sleeve a lower end positioned in the sea bed below the sea floor, an upper end positioned above the sea floor, an inner surface extending between the upper end and the lower end, an outer surface extending between the upper end and the lower end, and a slit extending helically about the second sleeve;
   wherein the slit extends radially from the inner surface to the outer surface of the second sleeve.

10. The offshore system of claim 9, wherein the first sleeve has a first portion extending from the sea floor to the upper end of the first sleeve and a second portion extending from the sea floor to the lower end of the first sleeve, wherein the first portion has a first axial length and the second portion has a second axial length that is the same as the first axial length; and wherein the second sleeve has a first portion extending from the sea floor to the upper end of the second sleeve and a second portion extending from the sea floor to the lower end of the second sleeve, wherein the first portion of the second sleeve has a first axial length and the second portion of the second sleeve has a second axial length that is the same as the first axial length of the first portion of the second sleeve.

11. A bend restrictor for restricting bending of a conductor extending into the sea floor, the bend restrictor comprising:

a sleeve disposed about the conductor, wherein the sleeve has a lower end positioned in the sea bed below the sea floor and an upper end positioned above the sea floor;

an annular slit extending radially through the sleeve and having a helical pitch P;

wherein the sleeve has a first portion extending from the sea floor to the upper end and a second portion extending from the sea floor to the lower end;

wherein the first portion has a first axial length and the second portion has a second axial length that is the same as the first axial length; and wherein the sleeve has an inner surface that tapers radially inward moving from the lower end to the upper end.

12. The bend restrictor of claim 11, wherein a portion of the sleeve engages the conductor.

13. The bend restrictor of claim 12, wherein the upper end of the sleeve engages the conductor.

14. The bend restrictor of claim 11, wherein the sleeve has a uniform radial thickness between the upper end and the lower end.

15. The bend restrictor of claim 11, wherein the pitch P varies along the length of the sleeve.

16. The bend restrictor of claim 11, wherein the sleeve has a radial thickness between 0.25 in. and 3 in. and an axial length measured between the upper end and the lower end, wherein the axial length is greater than 10 m.

17. The bend restrictor of claim 11, wherein the bend restrictor comprises an inner sleeve disposed about the conductor and an outer sleeve disposed about the inner sleeve, wherein each sleeve includes a helical slit.

18. A bend restrictor for restricting bending of a conductor extending into the sea floor, the bend restrictor comprising:

a sleeve disposed about the conductor, wherein the sleeve has a lower end positioned in the sea bed below the sea floor and an upper end positioned above the sea floor;

an annular slit extending radially through the sleeve and extending helically and continuously from the upper end to the lower end;

wherein the annular slit has a helical pitch P; and wherein the sleeve has a first portion extending from the sea floor to the upper end and a second portion extending from the sea floor to the lower end.

19. The bend restrictor of claim 18, wherein the sleeve has an inner surface that tapers radially inward moving from the lower end to the upper end.

20. The bend restrictor of claim 18, wherein the pitch P varies along the length of the sleeve.

21. The bend restrictor of claim 18, wherein the bend restrictor comprises an inner sleeve disposed about the conductor and an outer sleeve disposed about the inner sleeve, wherein each sleeve includes a helical slit.

* * * * *